United States Patent
Scherpa et al.

(10) Patent No.: US 8,412,624 B2
(45) Date of Patent: Apr. 2, 2013

(54) MULTIPLE FINANCIAL ACCOUNT TRANSACTION PROCESSING

(75) Inventors: Josef Scherpa, Fort Collins, CO (US); Andrew L. Schirmer, Andover, MA (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 451 days.

(21) Appl. No.: 12/174,663

(22) Filed: Jul. 17, 2008

(65) Prior Publication Data

US 2010/0017325 A1  Jan. 21, 2010

(51) Int. Cl.
*G06Q 40/00* (2006.01)
(52) U.S. Cl. .......................................................... 705/39
(58) Field of Classification Search .................. None
See application file for complete search history.

(56) References Cited

U.S. PATENT DOCUMENTS

| | | | |
|---|---|---|---|
| 7,801,814 B2 * | 9/2010 | Cataline et al. ................ | 705/39 |
| 2004/0210498 A1 * | 10/2004 | Freund ........................... | 705/30 |
| 2004/0210506 A1 * | 10/2004 | Algiene et al. ................. | 705/37 |
| 2007/0078869 A1 * | 4/2007 | Carr et al. ..................... | 707/100 |
| 2009/0006151 A1 * | 1/2009 | Zarghami et al. ................ | 705/7 |

OTHER PUBLICATIONS

Gizmodo, iCache: All Your Credit Cards, One Device, Fingerprint Security, <http://gizmodo.com/gadgets/icache/> (Last visited Jul. 11, 2008).

* cited by examiner

*Primary Examiner* — Hani M Kazimi
*Assistant Examiner* — Hatem M Ali
(74) *Attorney, Agent, or Firm* — Cuenot, Forsythe & Kim, LLC

(57) ABSTRACT

A computer-implemented method of point of sale transaction processing can include determining an identity of a user at a transaction site, identifying a plurality of financial accounts associated with the user, and for each financial account, accessing account information associated with the account. The method can include identifying a vendor type for the transaction site, selecting a financial account with which to process a transaction according to the vendor type and the account information for each of the plurality of accounts, and outputting the selected financial account. A list of financial accounts and incentives may be presented from which a user may select a particular financial account for processing the transaction.

17 Claims, 2 Drawing Sheets

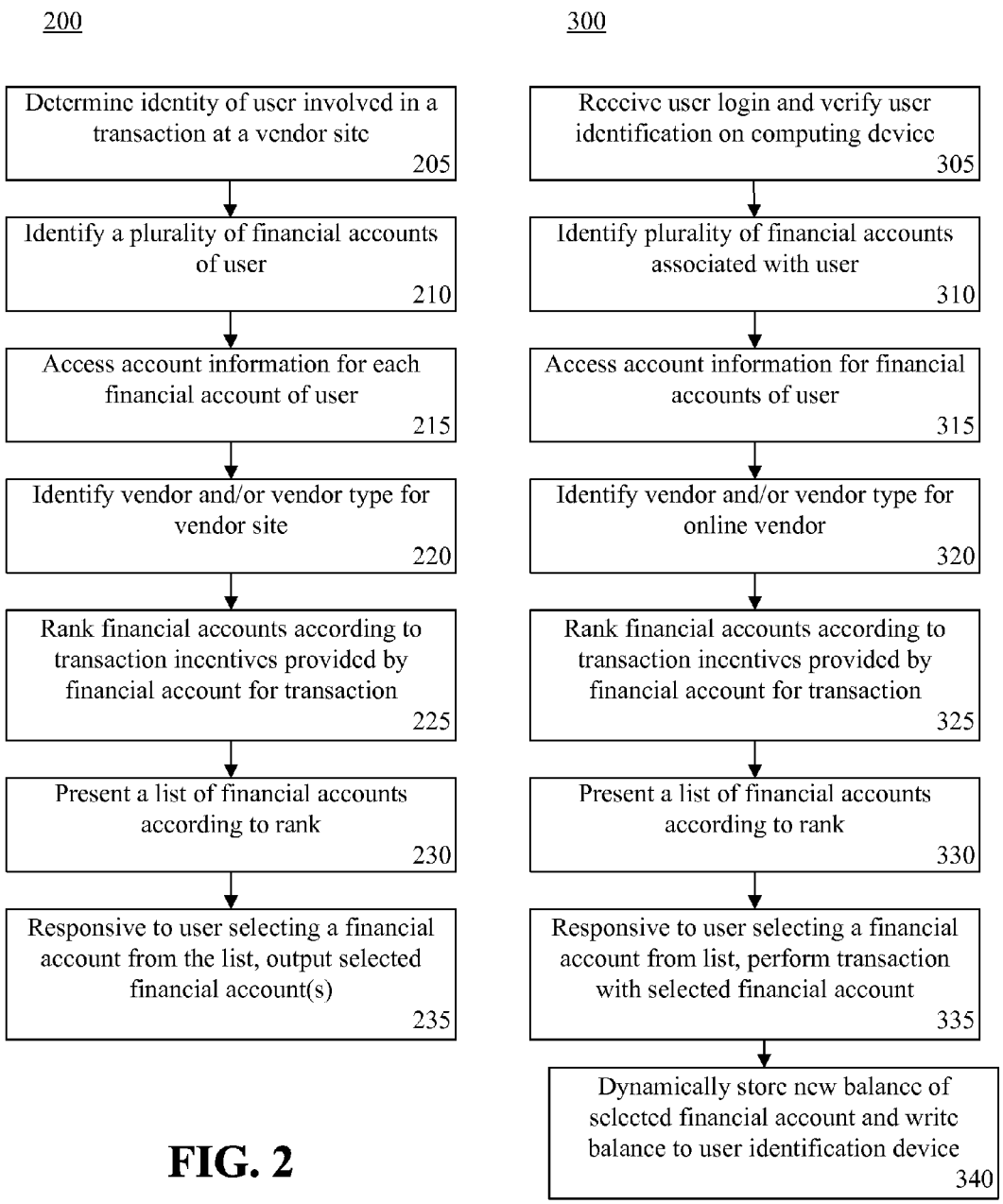

MULTIPLE FINANCIAL ACCOUNT TRANSACTION PROCESSING

BACKGROUND

Point of sale (POS) transaction technology has significantly evolved from cash registers and stand alone credit card machines. Present day POS technologies allow a user to make a purchase using a variety of financial instruments and can provide limited banking services. For example, the user can purchase goods and/or services using a credit or a debit card issued from a variety of financial institutions such as banks, investment houses, credit institutions, and the like. Some POS vendors can cash and authenticate checks in real time, provide cash back to the user after purchases, check credit histories, activate gift cards, track inventory as well as provide other financial services. In some cases, the POS terminal can be mobile, enabling the vendor to process transactions at the site of the purchaser, e.g., a mobile POS terminal with which a waitress can process a bill of a diner at the diner's table.

BRIEF SUMMARY OF THE INVENTION

The embodiments disclosed herein relate to transaction processing. One embodiment of the present invention can include a computer-implemented method of point of sale transaction processing. The method can include determining an identity of a user at a transaction site, identifying a plurality of financial accounts associated with the user, and for each financial account, accessing account information associated with the account. The method can include identifying a vendor type for the transaction site, selecting a financial account with which to process a transaction, according to the vendor type and the account information for each of the plurality of accounts, and outputting the selected financial account.

Another embodiment of the present invention can include a computer-implemented method of transaction processing on a computing device. The method can include identifying a plurality of financial accounts associated with the user during a computer based transaction with a vendor. For each financial account, account information associated with the account can be accessed, and a vendor type can be determined for the vendor. The method can include selecting at least one financial account with which to process a transaction according to the vendor type and the account information for each of the plurality of accounts. The selected financial account can be output.

Yet another embodiment of the present invention can include a computer program product including a computer-usable medium having computer-usable program code that, when executed, causes a machine to perform the various steps and/or functions described herein.

BRIEF DESCRIPTION OF THE SEVERAL VIEWS OF THE DRAWINGS

FIG. 2 is a flow chart illustrating a method of processing point of sale transactions in accordance with another embodiment of the present invention.

FIG. 3 is a flow chart illustrating a method of processing transactions on a computing device in accordance with another embodiment of the present invention.

DETAILED DESCRIPTION OF THE INVENTION

Figure 1:
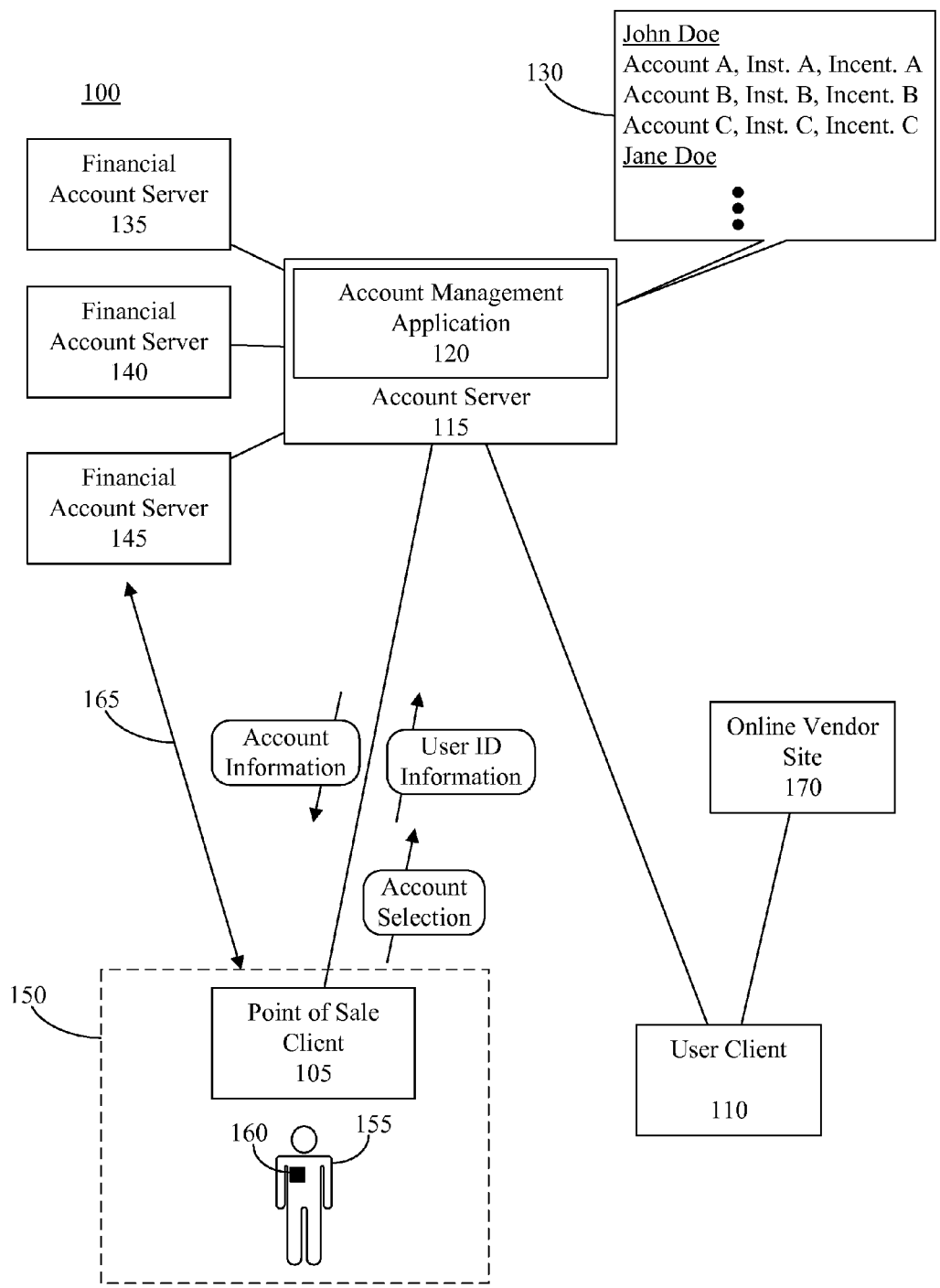
FIG. 1 is a block diagram illustrating a system for multiple account transaction processing in accordance with one embodiment of the present invention.

As will be appreciated by one skilled in the art, embodiments of the present invention may take the form of a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, an embodiment of the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The embodiments disclosed herein, relate to multiple financial account transaction processing. A user involved in a transaction can be identified by a computing device. Upon identifying the user, a list of financial accounts associated with the user that are available for processing the transaction can be identified. Account information can be retrieved from financial institution(s) associated with each financial account on the list or a user identification device. Using the retrieved account information, the list of financial accounts can be ranked according to a "value" of transaction incentives provided by each financial account based upon one or more aspects of the transaction.

As used herein, "incentives," can refer to any reward, discount, gift, benefit, or other form of direct or indirect compensation provided by a financial institution, to an account holder of the financial institution in connection with an account of the user, in exchange for using the financial account when processing a transaction, e.g., to pay for goods and/or services. Additionally, the transaction incentive need not be a direct reward from the financial institution. In such cases, the transaction incentive can be an avoidance of a penalty for using a particular financial account or avoiding placing the particular financial account in an unfavorable state. As an example, the transaction can exceed a credit limit for a financial account, the transaction leading to an over limit fee and/or an increased interest rate for the financial account. This can be viewed as a negative type of incentive, e.g., a disincentive.

Accordingly, the user can select one or more financial accounts with which to process the transaction based upon the presented account information. Subsequent to processing the transaction, the account information for each financial account of the user can be dynamically updated. The new account information can be transmitted to the financial institution(s) associated with the selected financial accounts.

FIG. 1 is a block diagram illustrating a system 100 for processing point of sale transactions in accordance with one embodiment of the present invention. The system 100 can include a point of sale (POS) client 105, a user client 110, and an account server 115. The POS client 105, user client 110, and account server 115 each can be implemented as a data processing system.

A data processing system can store and/or execute program code for performing the various functions described herein. Each data processing system can include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

For example, the POS client 105 can be implemented as any of a number of vendor site transaction devices including an electronic cash register, a vending kiosk, an automatic teller machine, a mobile transaction device, a stand alone credit card processing device, or the like. In one embodiment, the POS client 105 may be implemented as a dumb terminal that communicates with another computer system (not shown) that is located on the premises, e.g., at POS location 150.

In any case, the POS client 105 can include one or more display devices upon which the vendor and/or user can view information related to a transaction. For example, the POS client 105 can include a touch screen display or other I/O device capable of accepting user inputs, credit and/or user identification card readers and/or writers, biometric readers, radio frequency identification (RFID) readers, or the like. The POS client 105 also may interface with peripheral devices such as printers. Each of these peripheral devices can be physically integrated within the POS client 105 or exist as a separate entity coupled to the POS client 105 via hardwire or wireless connection. For example, a fingerprint reader can be coupled via a universal serial bus (USB) connection or wirelessly via an 802.11 connection to the POS client 105 and for use in verifying the identity of the user.

Both the POS client 105 and the user client 110 can provide an interface through which the vendor and/or user can communicate with the account server 115. The user client 110, however, illustrates the case in which the user may desire direct access to the system 100, without being located at a vendor site, e.g., POS location 150, when making a transaction. In that case, the user can access financial account information directly and use aggregated financial account information to process the transaction. For example, a user at home can make an online transaction through a home computing device, interacting with the system 100 and online vendor site 170 via an Internet protocol (IP) connection. In this regard, it should be appreciated that user client 110 and online vendor 170 can operate independently of POS client 105 and are illustrative of an online or Internet-based transaction that does not take place at POS location 150. Thus, system 100 may not include user client 110 or may include user client 110 in lieu of POS client 105.

The system 100 can include one or more of POS client 105 and/or user client 110 remotely located from one another, e.g., whether in different rooms or buildings, 10-20 feet from one another, or within different cities or countries. POS client 105 can communicate with system 100 via a communication network (not shown). The communication network can be implemented as, or include, without limitation, a WAN, a LAN, the Public Switched Telephone Network (PSTN), the Web, the Internet, and one or more intranets. The communication network 125 further can be implemented as or include one or more wireless networks, whether short or long range, and/or mobile.

The account server 115 can execute account management application 120 (hereafter "account application"). Account application 120 can implement program logic that allows the account server 115 to implement a variety of functions prior to, during, and after a POS transaction. Additionally, the account server 115 can store account data 130. Account data 130 can include a listing of system 100 users and accounts available to each user for processing the transaction. A transaction, as used herein, can refer to an exchange of goods and/or services for payment of some kind. The payment can be rendered using an account, whether a debit or credit account, that is charged for the good and/or service.

For example, in FIG. 1, user John Doe has a listing of three financial accounts available to process the transaction. Each of the accounts, account A, account B, and account C, can be associated with a financial institution whose server can be contacted to access account information for John Doe. For example, account A is associated with financial institution A whose server, financial account server 135, contains account information for financial account A of user John Doe. In addition, account data 130 can include contact and login information for each financial account server 135, 140, and 145, e.g., user name, password, and/or PIN for each financial account. Account server 115 can login to each financial account server 135-145 with the contact information and exchange financial account information associated with each financial account of the user. Additionally, account data 130 can include account information necessary to process a transaction, e.g., charge an account, using a particular financial account of John Doe, e.g., financial account number, account expiration date, PIN, or the like. The list of financial accounts, and additional user and/or account information, can be provided by user 155 when creating a user account within the system 100.

The account data 130 can include the most recent account information for each financial account of user 155. Account information further can include incentives provided to user 155 for transactions processed with each respective financial account. In one embodiment, the account application 120 can direct the account server 115 to contact each of the financial account servers 135-145 at a predetermined time interval and receive updated account information. In this manner, the account data 130 for each user can be kept in an updated state for use responsive to the initiation of the transaction. In another embodiment, the account application 120 can direct the account server 115 to contact each of the financial account servers 135-145 responsive to the initiation of a transaction or responsive to a user and/or vendor request. As such, account information of user 155 can be updated each time a transaction or a user and/or vendor request occurs.

The account server 115, executing the account application 120, can issue requests to the financial account servers 135-145 as to actions necessary to exchange user account information, and transaction processing information, during the POS transaction. For example, the financial account server 135, responsive to a request from the account server 115, can retrieve user account balances and transaction incentives offered by each financial account. In addition, the financial account servers 135-145 can request and receive account information, from account server 115, of debits and/or credits to the financial account(s) of users, such as John Doe, as a result of the transaction.

In operation, a vendor can process a POS transaction at POS location 150 with user 155 at the POS client 105. During the transaction, an identification device 160 associated with user 155 can be used by the POS client 105 to determine the identity of user 155. The identification device 160 can be implemented as, an identification or financial account card, e.g., a credit card, an RFID tag, a mobile phone, electronic wallet, or other form of digital identification. Alternatively, user 155 can securely access the system 100 through the POS client 105 via a password enabled login input by user 155 or biometric data read from user 155, e.g., a fingerprint of user 155.

The POS client 105 can transmit user identification information to the account server 115 where the account application 120 can determine or verify the identity of user 155 by comparing received identify information for user 155 with pre-stored identification data. Upon determining and/or verifying the identity of user 155, account server 115 can retrieve account data 130 associated with user 155. Account data 130 can include a list of financial accounts associated with user 155. Additionally, the POS client 105 can transmit transaction and vendor information to the account server 115 which may be of use in processing the transaction, e.g. transaction amount, transaction item, vendor name, or the like.

The account server 115 can request and receive, from the financial account servers 135-145, account information associated with each financial account of user 155. In the case that account data 130 requires updating, the application server 115 can contact each of the financial account servers 135-145 for present account information with which to update account data 130.

The account application 120 can process the user account information to determine transaction incentives available to user 155 should the present transaction with the vendor be processed using each financial account. As noted, user account information can include incentives available for each respective account and the conditions that must be met for those incentives to apply. As such, transaction incentives can be identified by the account application 120 using account information provided by the account servers 135-145, the account information provided by user 155 when registering with account server 115, and transaction information provided by the user 155 and/or POS client 105 at the POS location 150.

For example, user 155 can begin a purchase of a television set at department store A. User 155 can place a debit card in a card reader which obtains identification information. The identification information for user 155, the vendor name, and transaction information can be transmitted to server 115. The account application 120 can determine or verify the identity of the user 155 and retrieve financial accounts available to user 155 for processing the transaction, in this example. Processing the account information, the account application 120 can determine that financial account A offers a 10 percent discount for purchases at department store A and financial account B offers a 5 percent discount to the user 155 for being over 65 years of age.

In one embodiment, the financial accounts of user 155 can be ranked according to the transaction incentives provide by the financial accounts. The account application 120 can determine the ranking of the financial account using a predetermined set of guidelines that account for when or whether each incentive is available for the current transaction. These guidelines may be adjusted according to user preference. For example, cash back incentives can be given a higher ranking than frequent flyer miles incentives. In another example, the account application 120 can determine a "best deal" ranking using a calculated value based upon incentive features such as type of incentive, quantity of incentive, time limits for the incentive, or the like. For example, dollar amounts can be ascribed to non-monetary awards with the user 105 specifying this valuation. Additionally, the "best deal" can be based upon a comparative improvement in the conditions surrounding the transaction as a result of selecting a particular financial account when processing a transaction. For example, the selected financial account can offer lower transaction fees and/or interest rates than each other available financial account for a given transaction.

The preceding examples are not meant to limit the invention, but rather illustrate the variety of ways in which incentives may be valued and compared. Each user may specify his or her preferences in terms of which incentives are of greater or lesser importance and further specify the weighting applied to each incentive or incentive type, e.g., airline points, merchandise points, cash back, etc., including negative incentives. The weighting of an incentive also can be adjusted as a user approaches an incentive goal. For example, when a number of gift points for a particular financial account is within a predetermined number of points of a value necessary for redeeming a user selected gift or a number of frequent flier miles for the particular financial account is within a predetermined number of miles necessary for awarding a free airline ticket, the importance of the particular incentive that is nearing the goal can be increased. In such cases, the weighting, e.g., favorability, of that particular financial account can be increased so that the account ranking is increased, thereby increasing the likelihood of the account being used and the incentive goal being reached.

The account server 115 can send a list of ranked financial accounts. The list may include one or more items of account information for each account of user 155, e.g., each transaction incentive available to user 155 for the present transaction to POS client 105 for presentation to user 155. The list can be ordered according to the ranking of the financial accounts. For example, the POS client 105 can present the ranked list via a display device or print out a listing of the top five incentives offered by financial accounts associated with user 155 for processing the transaction. Using the presented information, user 155 can select one or more financial accounts with which to process the transaction. In one embodiment, the selection of a financial account for processing the transaction can be performed automatically, without user interaction. For example, subsequent to ranking the financial account of user 155, the account application 120 can select the financial account with the highest ranking to perform the transaction and charge the amount of the transaction to the highest ranked financial account automatically.

Upon selecting the financial account for the transaction, in one embodiment, the account application 120 can serve as a facilitator of the entire POS transaction. As such, user 155 can select one or more financial accounts via inputs to POS client 105, e.g. financial account A. The selection of financial account A as well as information relevant to the processing of the transaction can be transmitted to account server 115. Responsive to the account selection, the account server 115 can contact financial account server 135 associated with financial account A and exchange account and transaction information, e.g., transaction amount, updated account balances, or the like, to charge the amount of the transaction to the selected account. Upon completion of the transaction, account server 115 can transmit the processing results, e.g., transaction approved, total transaction amount, or the like, to POS client 105. In this manner, the account application 120 can be an intermediary for all transaction processing between the POS client 105 and each financial account server 135-145.

In another embodiment, the transaction processing role of account application 120 can be limited to aggregating and presenting account information to POS client 105. In that case, the POS client 105 can request and receive account information necessary for processing the transaction from the account server 115. Responsive to the selection of financial account A, the POS client 105 can directly contact financial account server 135 and exchange account and transaction information, and process the transaction. Alternatively, a separate server dedicated to POS transaction processing can facilitate the transaction processing between POS client 105, account server 115, and financial account server 135. In either case, the role of account application 120 during transaction processing may be limited to ranking financial accounts and/or updating account data 130 with post transaction account information.

In another embodiment, the updated account information for financial account A can be written to identification device 160 associated with user 155. For example, identification device 160 of user 155 can be implemented as an electronic wallet. Upon completion of a transaction, POS client 105 can interface with identification device 160 and update account information for financial account A of user 155 used to process the transaction.

FIG. 2 is a flow chart illustrating a method 200 of processing point of sale transactions in accordance with another embodiment of the present invention. The method 200 can be implemented by the system as described with reference to FIG. 1.

Beginning in step 205, the system can determine an identity of a user involved in a transaction at a vendor site. As noted, a variety of approaches can be used to verify the identity of the user to the system. In step 210, the system can identify a plurality of financial accounts of the user. The plurality of financial accounts of the user can be stored in a memory location within the system or on an alternate network or data location. In one embodiment, a listing of the plurality of financial accounts of the user can be stored on a personal identification device of the user. For example, the user can present an electronic wallet to a reader on a POS client. The reader can be attached to the POS client as a peripheral device. Identification information on the electronic wallet can be read by the POS client and the user can gain access to the system. Additionally the identification device can contain a list of the financial accounts of the user which may be used for the transaction.

In step 215, the system can access account information for each of the plurality of financial accounts of the user. As noted, the account information can be aggregated from the account server, server(s) external to the system, or read from the personal identification device of the user. In step 220, the system can identify a vendor and/or vendor type for the vendor site. Vendor type can be used by the system to identify transaction incentives provided by financial accounts according to vendor type. For example, the user can be making a transaction at sports store A and using a credit card with Bank B. At the time of the transaction, Bank B may provide a five percent cash back incentive to the user for any purchase at sports store A. Identifying the vendor type, e.g., a sporting goods store, or the particular vendor by name, e.g., sports store A, can allow the system to determine from the account information that the five percent cash back incentive is available to the user. By comparison, no cash back is available from the other financial accounts. The vendor type can be explicitly sent from the POS client or may be determined from merchant identifications or other identifying information sent from the POS client to the account server.

Continuing with step 225, the system can rank the plurality of financial accounts according to transaction incentives provided by each financial account to the user. As noted, the transaction incentives can be determined according to user account information and the vendor type of the transaction site and compared. In one embodiment, the method of ranking the financial accounts can be programmable by the user. In that case, the ranking of the financial accounts can reflect the preference of the user to a particular transaction incentive. For example, the user may prefer gift point incentives for transactions, and as a result, greater weighting can be applied to gift point incentives when determining rank for each financial account. Further, weighting can vary by account. For example, airline points on one account may be worth more to the user than airline points on another account. Similarly, airline points on account A may be worth less than cash back on account B. Still, airline points on account C may be worth more than cash back on account B. As noted, the weightings further can vary by vendor type and balance per account. In any case, the account server can determine which incentives for each account are applicable to the current transaction, e.g., whether conditions associated with each incentive are met, calculate a valuation for applicable incentive, and order each financial account according to rank.

In step 230, a list of the plurality of financial accounts, sorted or listed according to rank, can be presented to the user. In one embodiment, the list can include the name, the account balance, the associated financial institution, or the transaction incentives associated with each account, a computed valuation for each incentive that is applicable to the current POS transaction, or any account information that may facilitate the selection of a financial account for the transaction. For example, a display on the POS client of the vendor can present the ranking of each financial account to the user. In addition, the presented list can contain incentives offered by each financial account of the user, thereby allowing the user to select at least one financial account to process the transaction based upon the incentives. Upon viewing the ranked list of transaction financial accounts, the user can input to the system the selection of at least one financial account to process the transaction.

In step 235, responsive to the user selecting at least one financial account from the list, the system can output the at least one selected financial account to process the transaction. As noted, once the at least one selected financial account is output, the processing of the transaction can be performed by the system, a separate dedicated POS transaction processing system, or by the POS client communicating directly with each financial institution associated with the selected financial account(s).

FIG. 3 is a flow chart illustrating a method 300 of processing transactions on a computing device in accordance with another embodiment of the present invention. The method 300 can be implemented by the system as described with reference to FIG. 1. The method 300 illustrates embodiments of transaction processing which can be implemented without a user being located at a vendor site and/or processing a transaction through a POS client associated with the vendor. Method 300 illustrates the case where the transaction can be initiated through a host computing device, e.g. on a home computer communicating via the Internet to an online transaction Web site.

Accordingly in step 305, the system can receive a user login and verify an identity of the user on the host computing device. As noted, a variety of techniques and/or devices can be used to verify the identity of the user. In one embodiment, an identification device of the user can be used to store account information associated with the user as well as user identification information.

Additionally, the implementation of the account application within the system can affect the manner of the user login process. In one embodiment, for example, the account application can be implemented as a stand alone module operating within the host computing device or as a plug-in module within a host application, e.g., within a Web browser, operating within the host computing device. In such cases, the login can be input to the account application within the host computing device. In another embodiment, the account application can reside within an offsite server accessible to the user via a communication network. The offsite server can be part of a separate online account management system or embedded within the transaction processing system of an online vendor site. In that case, the identification information can be transmitted via the communication network and processed at a location external to the host computing device.

In step 310, the system can identify a plurality of financial accounts associated with the user. The list of financial accounts can be stored within the host computing device, an identification device associated with the user, or an online location accessible to the host computing device. For example, the user can input to the system account information related to each financial account in the list of financial accounts associated with the user for storage on a home computer, e.g., the host computing device, or provide such information to an online account management site. Subsequent to storage, the account information may be recalled at the time of the transaction. For example, when the list of the financial accounts is stored on the identification device associated with the user, the list can be read from the identification device at the time of the transaction.

In step 315, the system can access account information for each financial account on the list. The account application can access account information from online servers associated with each financial institution associated with a financial account. In one embodiment, the host computing device can communicate directly with the server associated with each account and store the account information received from each of the servers. In another embodiment, the account information can be collected by an online account management site and then presented to the user on the host computing device.

In yet another embodiment, the host computing device can transmit the list of financial accounts to the online vendor site. Receiving the list of accounts, the online vendor site can collect the account information from the server of each financial institution and transmit the account information to host computing device. In still another embodiment, the financial account information can be stored on, and/or read from, the identification device associated with user.

Continuing in step 320, the system can identify a vendor and/or vendor type for the online vendor site. As the vendor can be an online site, identifying the vendor type can be accomplished using a variety of methods. For example, information passed by the online vendor site, e.g., a universal resource locator (URL) associated with the online vendor site, can be used to identify the vendor type. In another example, the user can provide a list of online vendors to be used for transactions and store the vendor list within the system. The vendor list can include an identifier and a vendor type for each online vendor site.

In step 325, the financial accounts can be ranked according to transaction incentives provided by each financial institution for a transaction. As noted, the transaction incentives can be determined according to user account information and the vendor type of the transaction site. Further, the system can determine the ranking of the financial account using a predetermined set of guidelines.

In step 330, the system can present a list of a plurality of financial accounts according to rank. In step 335, responsive to the user selecting a financial account from list, the selected financial account(s) can be output and the transaction performed with the selected financial account(s). As used herein, "output" or "outputting" can include, but is not limited to, storing data in memory, e.g., writing to a file, writing to a user display or other output device, e.g., playing audible notifications, sending or transmitting to another system, exporting, or the like. The processing of the transaction can be performed by the system at an online server associated with an online account management site, a separate dedicated POS transaction processing system associated with the online vendor site, or by the host computing device, each communicating directly with each financial institution associated with the selected financial account(s).

In step 340, the system can store a new balance of the selected financial account(s) and write a new balance to the identification device of the user. In one embodiment, a server at an online site can store all financial and transaction information for the user. In addition, a new balance for each selected financial account can be dynamically updated on the server subsequent to a transaction. In another embodiment, the financial and transaction information, and the new balance information, can be dynamically updated and stored on the identification device and/or the computing device of the user. For example, at the completion of the transaction updated account information can be written to an electronic wallet, i.e., the identification device of the user. The electronic wallet, containing updated account information, can be carried by the user for use when processing online and/or POS transactions.

The flowcharts and block diagram in the Figures illustrate the architecture, functionality, and operation of possible implementations of systems, methods, and computer program products according to various embodiments of the present invention. In this regard, each block in the flowcharts or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowcharts illustration, and combinations of blocks in the block diagram and/or flowcharts illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of point of sale transaction processing, the method comprising:
   determining, via a processor, an identity of a user at a point of sale transaction site;
   identifying, via the processor, a plurality of financial accounts associated with the user;
   for each financial account, via the processor, accessing account information associated with the account;
   identifying, via the processor, a vendor type for the point of sale transaction site;
   comparing, via the processor, transaction incentives provided to the user by each financial account;
   selecting, via the processor, a financial account with which to process a transaction according to the vendor type, the transaction incomes provided to the user by each financial account, and the account information for each of the plurality of accounts; and
   outputting, via the processor, the selected financial account.

2. The computer-implemented method of claim 1, wherein determining the identity of the user at the point of sale transaction site further comprises determining tile user identity by reading a user identification device.

3. The computer-implemented method of claim 2, further comprising selecting the user identification device to be a writable and readable device that stores a list comprising at least one financial account and an available balance for each of the financial account on the list.

4. The computer-implemented method of claim 3, wherein selecting the financial account with which to process the transaction further comprises selecting the financial account with which to process the transaction from the list stored on the user identification device, the method further comprising:
   processing, via the processor, the transaction against the selected financial account;
   calculating, via the processor, a new available balance for the selected account; and
   storing the new available balance for the selected financial account on the user identification device.

5. The computer-implemented method of claim 1, wherein for each financial account, accessing account information associated with the account further comprises reading the account information from a user identification device that is a writable and readable device that stores an available balance for at least one financial account.

6. The computer-implemented method of claim 1, wherein selecting the financial account with which to process the transaction further comprises determining whether the transaction incentives associated with each financial account are applicable to the transaction according to the vendor type.

7. The computer-implemented method of claim 1, wherein selecting the financial account with which to process the transaction further comprises determining whether the transaction incentives associated with each financial account are applicable to the transaction according to a group association of the user.

8. The computer-implemented method of claim 1, wherein selecting the financial account with which to process the transaction further comprises:
   ranking the financial accounts according to a value of the transaction incentive associated with each financial account; and
   presenting the financial accounts and the transaction incentives to the user according to rank.

9. A computer-implemented method of transaction processing on a computing device, the method comprising:
   identifying, via a processor, a plurality of financial accounts associated with a user during a computer based transaction with a vendor;
   for each financial account, accessing, via the processor, account information associated with the account;
   comparing, via the processor, transaction incentives provided to the user by each financial account;
   identifying, via the processor, a vendor type for the vendor;
   selecting, via the processor, a financial account with which to process a transaction according to the vendor type, the transaction incentives provided to the user by each financial account, and the account information for each of the plurality of accounts; and
   outputting, via the processor, the selected financial account.

10. The computer-implemented method of claim 9, wherein selecting the financial account with which to process the transaction further comprises determining whether the transaction incentives associated with each financial account are applicable to the transaction according to the vendor type.

11. The computer-implemented method of claim 9, wherein selecting the financial account with which to process the transaction further comprises determining whether the transaction incentives associated with each financial account are applicable to the transaction according to a group, association of the user.

12. The computer-implemented method of claim 9, wherein selecting the financial account with which to process the transaction further comprises:
   ranking the financial accounts according to a value of the transaction incentive associated with each financial account; and
   presenting the financial accounts and the transaction incentives to the user according to rank.

13. The computer-implemented method of claim 9, wherein for each financial account, accessing account information associated with the account further comprises accessing the account information from a memory disposed within the computing device.

14. A computer program product comprising:
   a non-transitory computer readable medium comprising computer readable program code stored thereon that processes a point of sale transaction, the computer readable medium comprising:
   computer readable program code that determines an identity of a user at a point of sale transaction site;
   computer readable program code that identities a plurality of financial accounts associated with the user; and
   computer readable program code that for each financial account, accesses account information associated with the account;
   computer readable program code that compares transaction incentives provided to the user by each financial account;
   computer readable program code that identifies a vendor type for the point of sale transaction site;
   computer readable program code that selects a financial account with which to process a transaction according to the vendor type, the transaction incentives provided to the user by each financial account, and the account information for each of the plurality of accounts; and
   computer readable program code that outputs the selected financial account.

15. The computer program product of claim 14, wherein the non-transitory computer readable medium comprising the computer readable program code that determines the identity of the user at the point of sale transaction site further comprises computer readable program code that determines the user.

16. The computer program product of claim 14, wherein the non-transitory computer readable medium comprising the computer readable program code that selects the financial account with which to process the transaction further comprises computer readable program code that determines whether the transaction incentives associated with each financial account are applicable to the transaction according to the vendor type.

17. The computer program product of claim 14, wherein the non-transitory computer readable medium comprising the computer readable program code that selects the financial account with which to process the transaction further comprises computer readable program code that determines whether the transaction incentives associated with each financial account are applicable to the transaction according to a group association of the user.

* * * * *

UNITED STATES PATENT AND TRADEMARK OFFICE
CERTIFICATE OF CORRECTION

PATENT NO. : 8,412,624 B2  Page 1 of 1
APPLICATION NO. : 12/174663
DATED : April 2, 2013
INVENTOR(S) : Josef Scherpa and Andrew L. Schirmer It is certified that error appears in the above-identified patent and that said Letters Patent is hereby corrected as shown below:

In the Claims

At page 10, column 14, lines 31-36 of the Patent, Claim 15 should read:

--15.   The computer program product of claim 14, wherein the computer readable program code that determines the identity of the user at the point of sale transaction site further comprises computer readable program code that determines the user <u>identity by reading a user identification device</u>.--

Signed and Sealed this
Thirteenth Day of May, 2014

Michelle K. Lee
*Deputy Director of the United States Patent and Trademark Office*